United States Patent
DeLaGarza

(10) Patent No.: US 9,052,181 B1
(45) Date of Patent: Jun. 9, 2015

(54) PORTABLE DIGITAL READOUT MEASURING DEVICE

(71) Applicant: David A. DeLaGarza, Pasadena, TX (US)

(72) Inventor: David A. DeLaGarza, Pasadena, TX (US)

( * ) Notice: Subject to any disclaimer, the term of this patent is extended or adjusted under 35 U.S.C. 154(b) by 305 days.

(21) Appl. No.: 13/776,851

(22) Filed: Feb. 26, 2013

Related U.S. Application Data

(60) Provisional application No. 61/638,634, filed on Apr. 26, 2012.

(51) Int. Cl.
*G01B 3/20* (2006.01)

(52) U.S. Cl.
CPC ..................... *G01B 3/205* (2013.01)

(58) Field of Classification Search
CPC ............. G01B 3/20; G01B 3/205; G01B 3/22
USPC ........ 33/501.6, 700, 707, 708, 710, 783, 784, 33/819, 820, DIG. 1
See application file for complete search history.

(56) References Cited

U.S. PATENT DOCUMENTS

| | | | |
|---|---|---|---|
| 4,612,656 A | 9/1986 | Suzuki et al. | |
| 4,873,770 A * | 10/1989 | Luttmer et al. | 33/706 |
| 4,972,603 A | 11/1990 | Meyer | |
| 5,973,494 A | 10/1999 | Masreliez et al. | |
| 6,105,269 A * | 8/2000 | Kondrat | 33/512 |
| 7,245,199 B1 * | 7/2007 | Reilly | 33/640 |
| 7,735,237 B1 * | 6/2010 | Moon | 33/783 |
| 7,765,712 B2 * | 8/2010 | Stockman | 33/784 |
| 8,438,748 B1 * | 5/2013 | Moon | 33/783 |

FOREIGN PATENT DOCUMENTS

| | | | | |
|---|---|---|---|---|
| FR | 2589565 A1 * | 5/1987 | | G01B 3/20 |
| JP | 2008145282 A * | 6/2008 | | G01B 3/20 |
| WO | WO 9104459 A1 * | 4/1991 | | G01B 7/02 |

* cited by examiner

Primary Examiner — R. A. Smith

(57) ABSTRACT

A portable digital readout measuring device preferably includes a digital readout device, a guide and at least one mounting base. The guide is slidably retained in the digital readout device. The digital readout device preferably includes a LCD display and a readout magnet. The readout magnet is attached to a backside of the digital readout device. Preferably, a connection cable connects the digital readout device to a slave LCD display. The mounting base preferably includes a retention slot, at least one fastener and a base magnet. The guide is inserted into the slot and retained in the mounting base by tightening the at least one fastener. An alternative mounting base includes a round magnet. In use, the readout magnet is attached to a way of an industrial machine. The guide is slid, until the base magnet contacts a carriage of the machine.

20 Claims, 5 Drawing Sheets

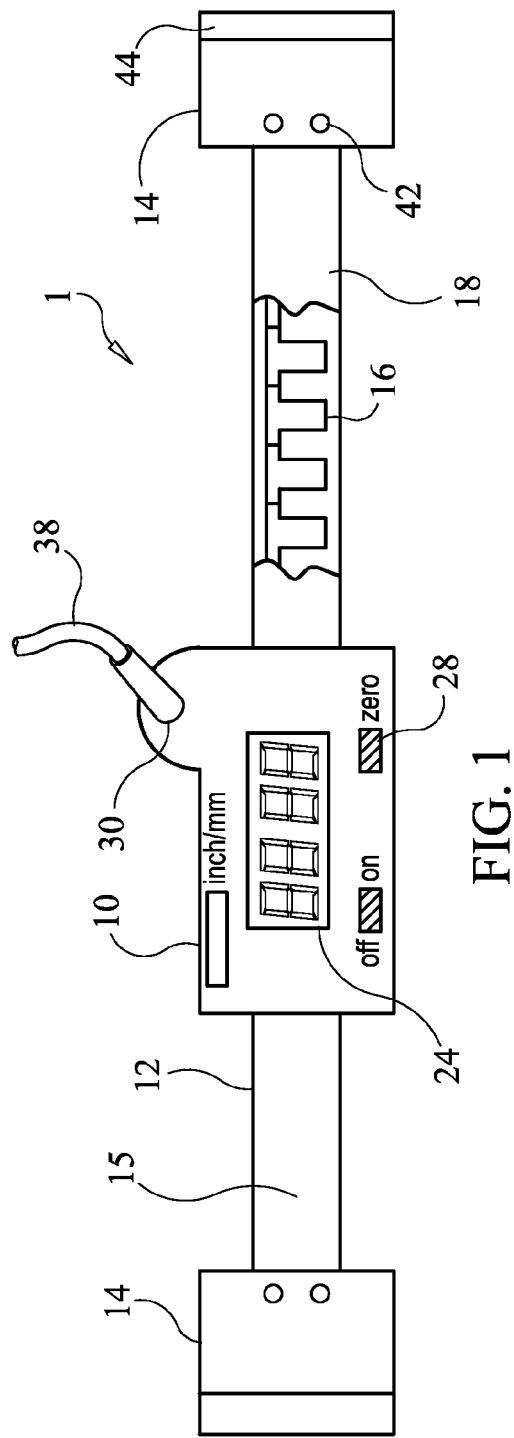
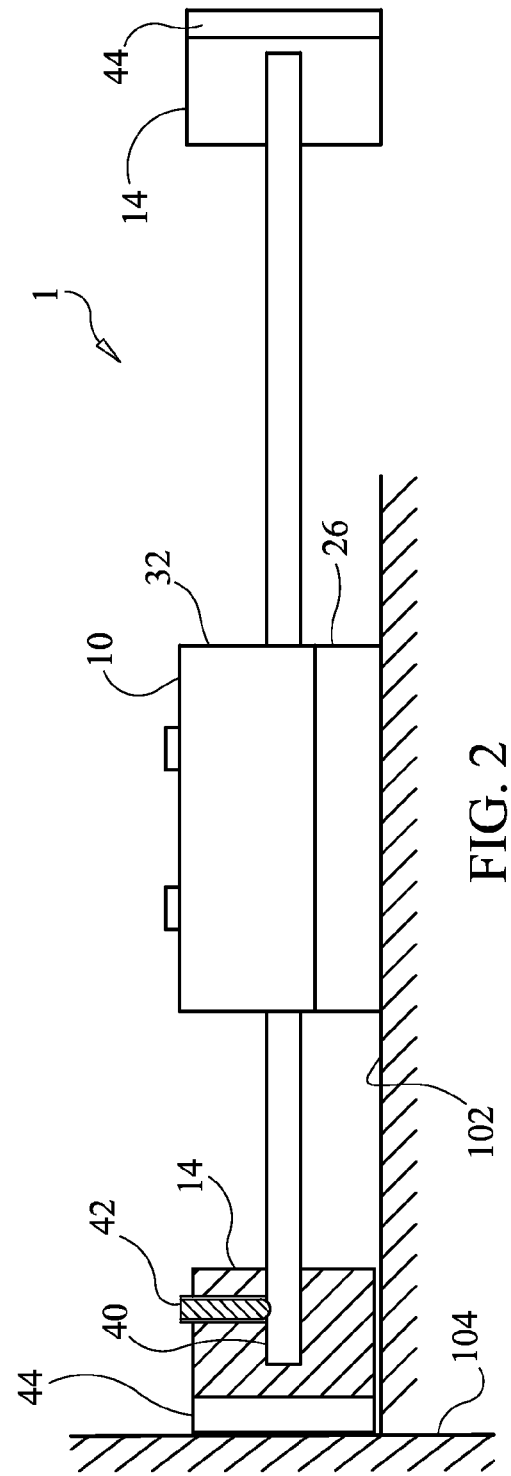
FIG. 1
FIG. 2

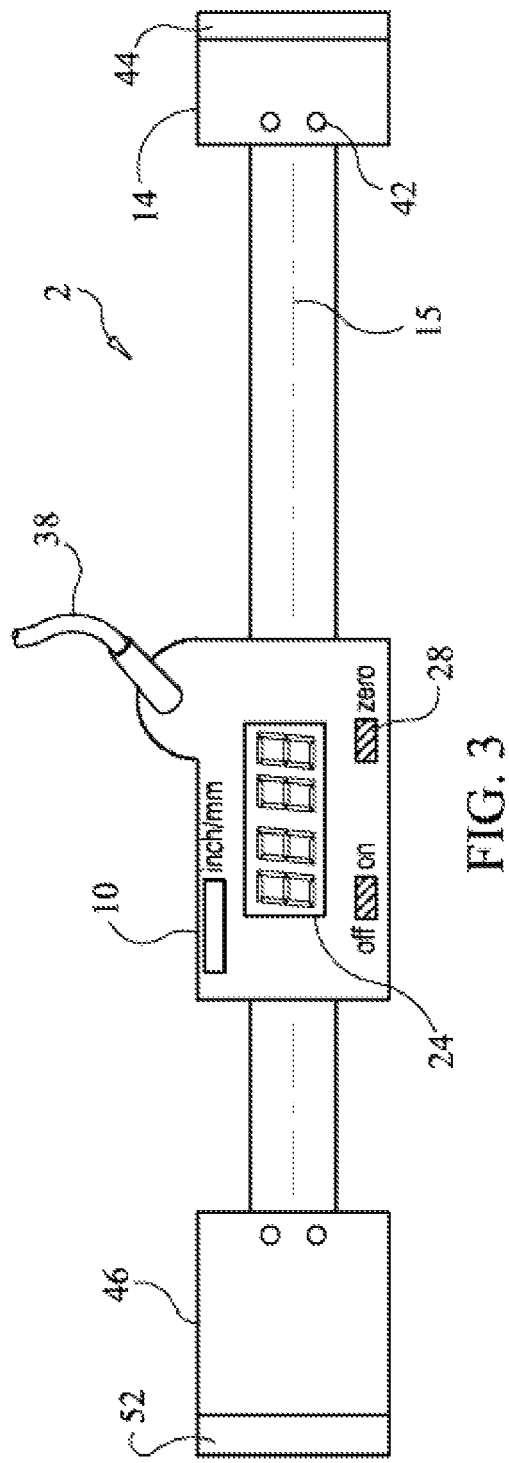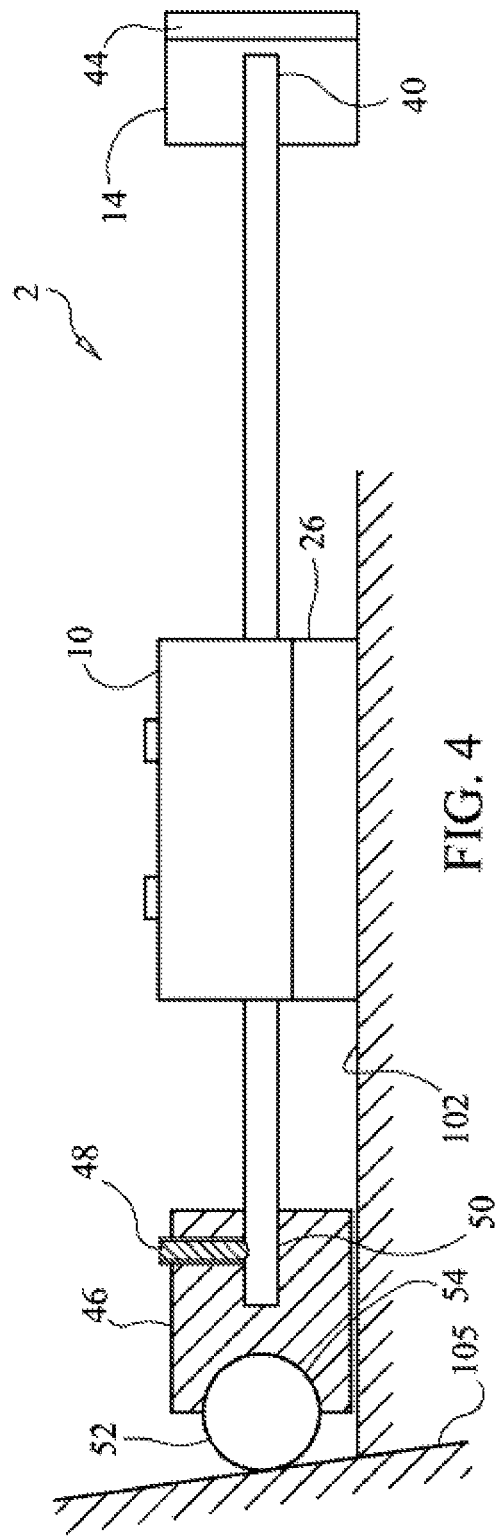

PORTABLE DIGITAL READOUT MEASURING DEVICE

CROSS-REFERENCES TO RELATED APPLICATIONS

This is a nonprovisional patent application taking priority from provisional application No. 61/638,634 filed on Apr. 26, 2012.

BACKGROUND OF THE INVENTION

1. Field of the Invention

The present invention relates generally to measuring devices and more specifically to a portable digital readout measuring device, which may be mounted to and removed from industrial machinery without the use of tools.

2. Discussion of the Prior Art

Many types of industrial machinery such as metal cutting machinery require the display of the amount of travel a carriage has made relative to ways of the industrial machinery. Frequently in machine shop environments, the display devices on the industrial machinery do not work. There are many types of measuring devices known in the art, such as digital machine scales that are rigidly mounted to the industrial machinery to provide a readout of the distance traveled by a carriage. There are also hand tools, such as measuring calipers with a digital readout device. However, it appears that no digital measuring device exists, which may be mounted to and removed from industrial machinery without the use of the tools. U.S. Pat. No. 4,612,656 to Suzuki et al. discloses a digital indication type measuring apparatus. U.S. Pat. No. 4,972,603 to Meyer discloses a linear measuring device. U.S. Pat. No. 5,973,494 to Masreliez et al. discloses an electronic caliper using a self-contained low power inductive position transducer, which is herein incorporated by reference in its entirety.

Accordingly, there is a clearly felt need in the art for a portable digital readout measuring device, which may be mounted to and removed from industrial machinery, such as milling machines, horizontal machines, bullards, vertical turret lathes, horizontal lathes and the like without the use of tools.

SUMMARY OF THE INVENTION

The present invention provides a portable digital readout measuring device, which may be mounted to and removed from industrial machinery without the use of tools. The portable digital readout measuring device preferably includes a digital readout device, a guide and at least one mounting base. The guide is slidably retained in the digital readout device. The guide includes an elongated length and a plurality of cross filaments or wires spaced along the elongated length. The digital readout device preferably includes an inductive pick-up, an electronic circuit, an LCD display, a readout magnet, a reset button and an output port. The inductive pick-up reads the plurality of cross filaments or wires and outputs a distance traveled by the digital readout device to the electronic circuit. The electronic circuit sends an electrical signal of the measurement to the LCD display. The readout magnet is attached to a backside of the digital readout device.

The reset button is used to zero the measurement displayed on LCD display. One end of a connection cable is connected to the output port and the other end of the outline is connected to a slave LCD display. The slave LCD display displays the same reading as shown on the digital readout device. The slave LCD device may be placed anywhere that is within a line-of-sight of a user. The mounting base preferably includes a retention slot, at least one fastener and a base magnet. The retention slot is formed in one end of the mounting base and the base magnet is secured to the other end of the mounting base. The retention slot is sized to receive a thickness of the guide. The at least one fastener is threaded into the mounting base, perpendicular to the retention slot. The guide is retained in the mounting base by tightening the at least one fastener against the guide. It is preferable to attach a single mounting base to each end of the guide to prevent the digital readout device from sliding off an end of the guide. A second embodiment of the mounting base includes a round base magnet, which is retained in the other end of the mounting base. The second embodiment of the mounting base is used for carriages, which have sides that are not square to the ways of the industrial machinery. In use, the readout magnet is attached to a way of an industrial machine. The guide is slid, until the base magnet contacts a carriage of the machine. The digital readout device is then zeroed with the reset button.

Accordingly, it is an object of the present invention to provide a portable digital readout measuring device, which may be mounted to and removed from industrial machinery, such as milling machines, horizontal machines, bullards, vertical turret lathes, horizontal lathes and the like without the use of tools.

These and additional objects, advantages, features and benefits of the present invention will become apparent from the following specification.

BRIEF DESCRIPTION OF THE DRAWINGS

FIG. 1 is a top view of a portable digital readout measuring device in accordance with the present invention.

FIG. 2 is a side view of a portable digital readout measuring device attached to a way and carriage of an industrial tool machine in accordance with the present invention.

FIG. 3 is a top view of a second embodiment of a portable digital readout measuring device, which is attachable to a non-vertical carriage surface in accordance with the present invention.

FIG. 4 is a side view of a second embodiment of a portable digital readout measuring device, which is attached to a way and a non-vertical carriage surface in accordance with the present invention.

DETAILED DESCRIPTION OF THE PREFERRED EMBODIMENTS

Figure 5:
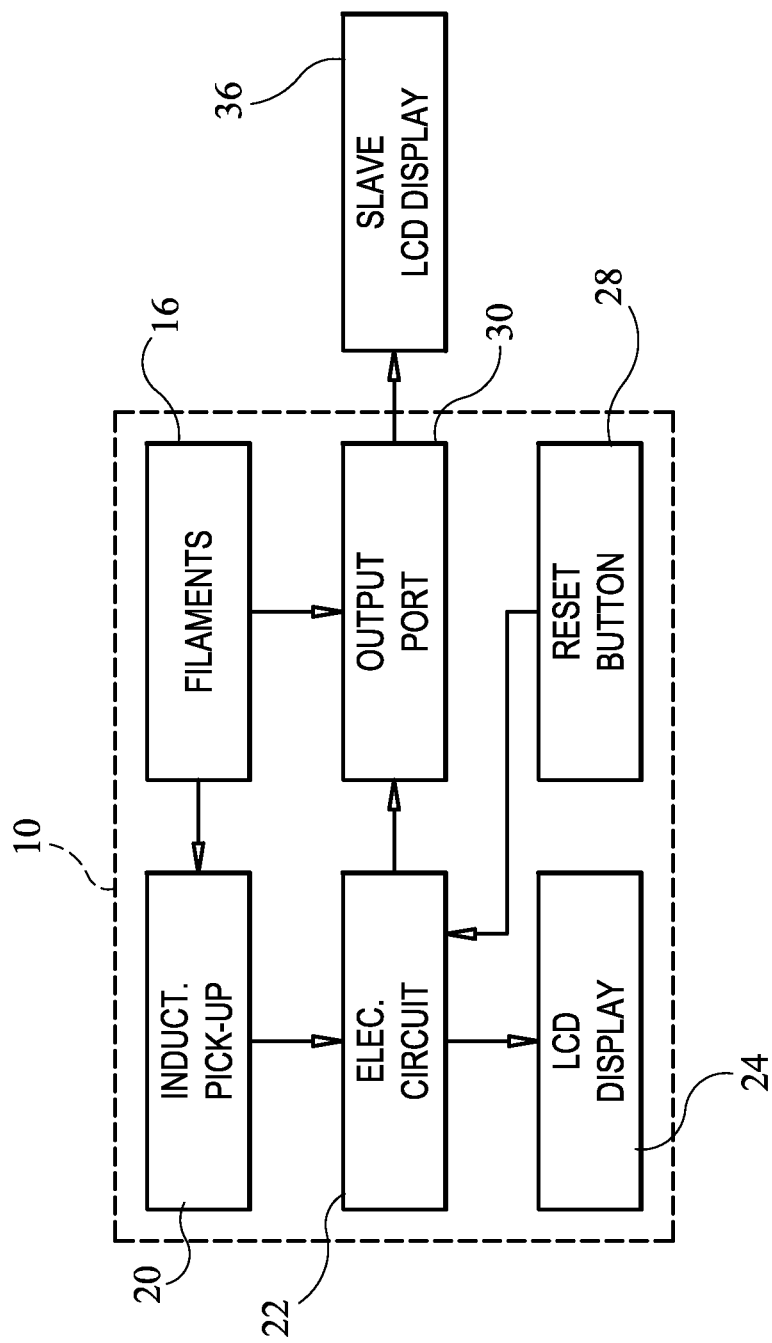
FIG. 5 is a schematic diagram of a digital readout device of a portable digital readout measuring device in accordance with the present invention.
Figure 7:
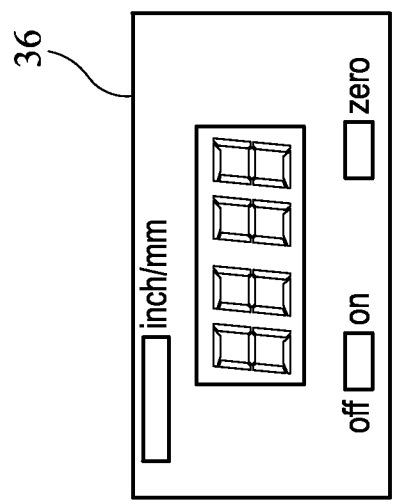
FIG. 7 is a end view of a slave LCD device of a portable digital readout measuring device in accordance with the present invention.
Figure 6:
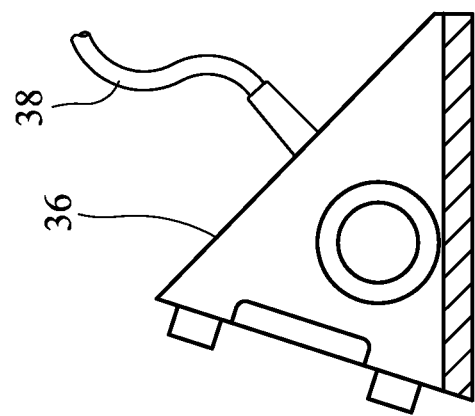
FIG. 6 is a front view of a slave LCD device of a portable digital readout measuring device in accordance with the present invention.

With reference now to the drawings, and particularly to FIG. 1, there is shown a front view of a portable digital readout measuring device 1. With reference to FIG. 2, the portable digital readout measuring device 1 preferably includes a digital readout device 10, a guide 12 and at least one mounting base 14. The guide 12 is slidably retained in the digital readout device 10. The guide 12 preferably includes an elongated length, a plurality of cross wires or filaments 16 spaced along the elongated length and a cover protective cover 18. The guide 12 includes a lengthwise axis 15. With reference to FIG. 5, the digital readout device 10 preferably includes an inductive pick-up 20, an electronic circuit 22, an LCD display 24, a readout magnet 26, a reset button 28 and an output port 30. The readout magnet 26 is attached to a bottom of the digital readout device 10 with glue, double sided tape or any other suitable attachment method.

The inductive pick-up 20 reads the plurality of cross wires or filaments 16 and outputs a distance traveled by the digital readout device 10 to the electronic circuit 22. The electronic circuit 22 sends an electrical signal of the measurement to the LCD display 24. A case 32 of the digital readout device 10 must be fabricated from a nonferrous material. Otherwise a stainless steel plate must be inserted between a bottom of the digital readout device 10 and the readout magnet 26.

A digital readout device and a guide from a Pittsburgh brand 6 inch digital caliper was used to produce the operation of the digital readout device 10 and the guide 12. The caliper fingers or projections were cutoff from the guide and the digital readout device. The depth gage was also cutoff from the digital readout device. Digital calipers are well known in the art and need not be explained in further detail. However, U.S. Pat. Nos. 4,612,656 and 5,973,494 are hereby incorporated by reference in their entirety. The reset button 28 is used to zero the measurement displayed on LCD display 24. An output port 30 is connected to an input of a slave LCD display 36 through a connection cable 38. The slave LCD display 36 displays the same reading as shown on the LCD display 24. The slave LCD device 36 may be placed anywhere that is within a line-of-sight of a user.

The mounting base 14 preferably includes a retention slot 40, at least one fastener 42 and a base magnet 44. The retention slot 40 is formed in one end of the mounting base 14 and the base magnet is secured to the other end of the mounting base 14 with glue, double sided tape or any other suitable attachment method. The retention slot 40 is sized to receive a thickness of the guide 12. The at least one fastener 42 is preferably threaded into the mounting base 14, perpendicular to the retention slot 40. The guide 12 is retained in the mounting base 14 by tightening the at least one fastener 42 against the guide 12. It is preferable to attach a single mounting base 14 to each end of the guide 12 to prevent the digital readout device 10 from sliding off an end of the guide 12. The second mounting base 14 may be used to secure the other end of the portable digital readout measuring device 1 to a carriage. However, if the second mounting base is not attached to a carriage surface, the base magnet 44 is not required.

With reference to FIGS. 3-4, a second embodiment of the portable digital readout measuring device 2 includes a mounting base 46. The mounting base 46 includes the at least one fastener 48, a retention slot 50 and a round base magnet 52. The round base magnet 52 includes a curved surface. The retention slot 50 is formed in one end of the mounting base 46 and the base magnet 52 is preferably pressed into a magnet opening 54 formed in the other end of the mounting base 46. The retention slot 50 is sized to receive a thickness of the guide 12. The at least one fastener 48 is preferably threaded into the mounting base 46, perpendicular to the retention slot 50. The guide 12 is retained in the mounting base 46 by tightening the at least one fastener 48 against the guide 12. The mounting base 46 is used for carriages 105, which have sides that are not square to the ways 102 of the industrial machine.

Figure 8:
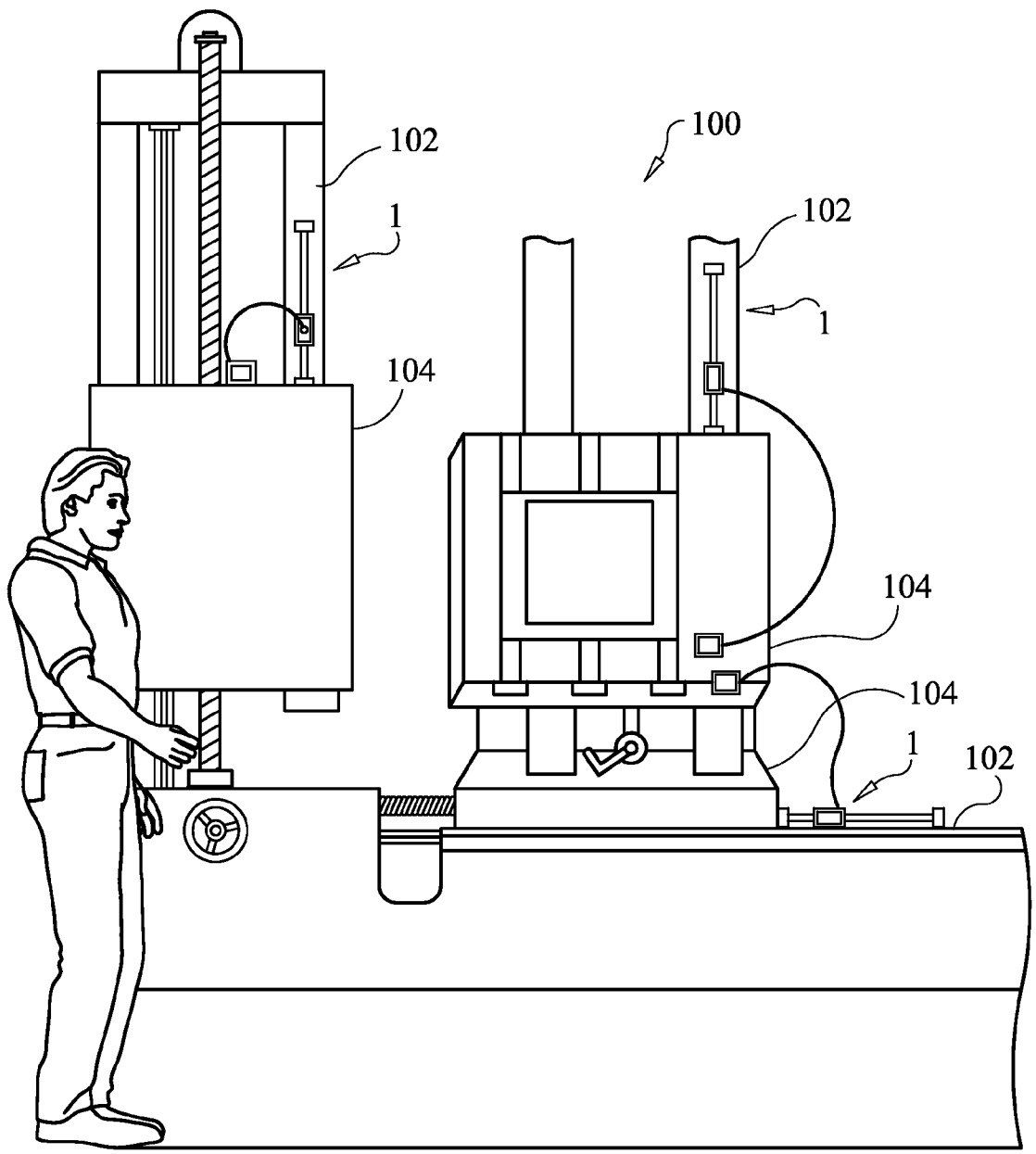
FIG. 8 is an industrial machine with a plurality of portable digital readout measuring devices attached thereto in accordance with the present invention.

With reference to FIG. 8, the readout magnet 26 is attached to the way 102 of an industrial machine 100. The guide 12 is slid toward a carriage 104, until the base magnet 44 or the round base magnet 52 contacts the carriage 104 of the industrial machine 100. The digital readout device 10 is then zeroed with the reset button 28. The portable digital readout measuring device 1, 2 may be used in both horizontal and vertical applications.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A portable digital readout measuring device comprising:
    a digital caliper includes a digital readout device and a guide, said digital readout device includes a LCD display, said guide is slidably retained in said digital readout device, wherein when said guide is moved relative to said digital readout device, distance traveled is displayed on said LCD display;
    a readout magnet is attached to a bottom of said digital readout device; and
    at least one mounting base includes a base magnet, one of said at least one mounting base is retained on one end of said guide, wherein said readout magnet is attached to a way of a machine, said base magnet is attached to a carriage of a machine, movement of said carriage relative to said way is displayed on said LCD display.

2. The portable digital readout measuring device of claim 1 wherein:
    said guide includes an elongated length and a plurality of filaments or wires, said plurality of filaments or wires are spaced along said elongated length.

3. The portable digital readout measuring device of claim 1 wherein:
    said guide includes an elongated length and a plurality of filaments or wires, said plurality of filaments or wires are spaced along said elongated length;
    said digital readout device includes an inductive pick-up and an electronic circuit, said inductive pick-up reads said plurality of filaments or wires, said inductive pick-up is connected to said electronic circuit, wherein the distance travel by said guide relative to said digital readout device is displayed on said LCD display.

4. The portable digital readout device of claim 1 wherein:
    one of said at least one mounting base includes a retention slot and at least one fastener, said retention slot is sized to receive a thickness of said guide, wherein said at least one fastener is tightened against said guide to retain thereof in said one of said at least one mounting base.

5. The portable digital readout measuring device of claim 1 wherein:
    said base magnet includes at least one of a flat surface and a curved surface.

6. The portable digital readout measuring device of claim 1 wherein:
    said digital readout device includes an output port for providing a measurement shown on said LCD display.

7. The portable digital readout measuring device of claim 1, further comprising:
    a slave LCD display for displaying the measurement shown on said LCD display, an output port for providing a measurement shown on said LCD display, said slave LCD display is connected to said output port through said connection cable.

8. A portable digital readout measuring device comprising:
a digital caliper includes a digital readout device and a guide, said digital readout device includes a LCD display and a reset button, said guide is slidably retained in said digital readout device, wherein when said guide is moved relative to said digital readout device, distance traveled is displayed on said LCD display, depressing said reset button zeros the distance traveled on said LCD display;
a readout magnet is attached to a bottom of said digital readout device; and
at least one mounting base includes a base magnet, one of said at least one mounting base is retained on one end of said guide, wherein said readout magnet is attached to a way of a machine, said base magnet is attached to a carriage of a machine, movement of said carriage relative to said way is displayed on said LCD display.

9. The portable digital readout measuring device of claim 8 wherein:
said guide includes an elongated length and a plurality of filaments or wires, said plurality of filaments or wires are spaced along said elongated length.

10. The portable digital readout measuring device of claim 8 wherein:
said guide includes an elongated length and a plurality of filaments or wires, said plurality of filaments or wires are spaced along said elongated length;
said digital readout device includes an inductive pick-up and an electronic circuit, said inductive pick-up reads said plurality of filaments or wire, said inductive pick-up is connected to said electronic circuit, wherein the distance travel by said guide relative to said digital readout device is displayed on said LCD display.

11. The portable digital readout measuring device of claim 8 wherein:
one of said at least one mounting base includes a retention slot and at least one fastener, said retention slot is sized to receive a thickness of said guide, wherein said at least one fastener is tightened against said guide to retain thereof in said one of at least one mounting base.

12. The portable digital readout measuring device of claim 8 wherein:
said base magnet includes at least one of a flat surface and a curved surface.

13. The portable digital readout measuring device of claim 8 wherein:
said digital readout device includes an output port for providing a measurement shown on said LCD display.

14. The portable digital readout measuring device of claim 8, further comprising:
a slave LCD display for displaying the measurement shown on said LCD display, an output port for providing a measurement shown on said LCD display, said slave LCD display is connected to said output port through said connection cable.

15. A portable digital readout measuring device comprising:
a digital caliper includes a digital readout device and a guide, said digital readout device includes a LCD display, said guide is slidably retained in said digital readout device, wherein when said guide is moved relative to said digital readout device, distance traveled is displayed on said LCD display;
a readout magnet is attached to a bottom of said digital readout device;
a first mounting base is retained on a first end of said guide; and
a second mounting base is retained on a second end of said guide, said second mounting base includes a base magnet, wherein said readout magnet is attached to a way of a machine, said base magnet is attached to a carriage of a machine, movement of said carriage relative to said way is displayed on said LCD display.

16. The portable digital readout measuring device of claim 15 wherein:
said guide includes an elongated length and a plurality of filaments or wires, said plurality of filaments or wires are spaced along said elongated length.

17. The portable digital readout measuring device of claim 15 wherein:
said guide includes an elongated length and a plurality of filaments or wires, said plurality of filaments or wires are spaced along said elongated length;
said digital readout device includes an inductive pick-up and an electronic circuit, said inductive pick-up reads said plurality of filaments or wire, said inductive pick-up is connected to said electronic circuit, wherein the distance travel by said guide relative to said digital readout device is displayed on said LCD display.

18. The portable digital readout measuring device of claim 15 wherein:
one of said first or second mounting base includes a retention slot and at least one fastener, said retention slot is sized to receive a thickness of said guide, wherein said at least one fastener is tightened against said guide to retain thereof in said one of at least one mounting base.

19. The portable digital readout measuring device of claim 15 wherein:
said base magnet includes at least one of a flat surface and a curved surface.

20. The portable digital readout measuring device of claim 15 wherein:
said digital readout device includes an output port for providing a measurement shown on said LCD display.

* * * * *